Jan. 8, 1924.

O. T. NELSON 1,480,290

CLUTCH MECHANISM

Filed Oct. 9, 1920

Oscar T. Nelson, Inventor
by Thurston Kwis Hudson, attys.

Patented Jan. 8, 1924.

1,480,290

UNITED STATES PATENT OFFICE.

OSCAR T. NELSON, OF CLEVELAND, OHIO, ASSIGNOR TO CHRISTIAN A. BARNHOLTH, OF AKRON, OHIO.

CLUTCH MECHANISM.

Application filed October 9, 1920. Serial No. 415,928.

*To all whom it may concern:*

Be it known that I, OSCAR T. NELSON, a citizen of the United States, residing at Cleveland, in the county of Cuyahoga and State of Ohio, have invented a certain new and useful Improvement in Clutch Mechanism, of which the following is a full, clear, and exact description.

The present invention relates to a clutch mechanism of which the driving and driven parts may be connected together.

The object of the invention is to provide a clutch in which the associate members of the clutch are brought into their engaged position by means of mechanism which causes a body of oil to be pocketed, the body of oil forming in effect the locking connection between the parts of the clutch.

Figure 1:
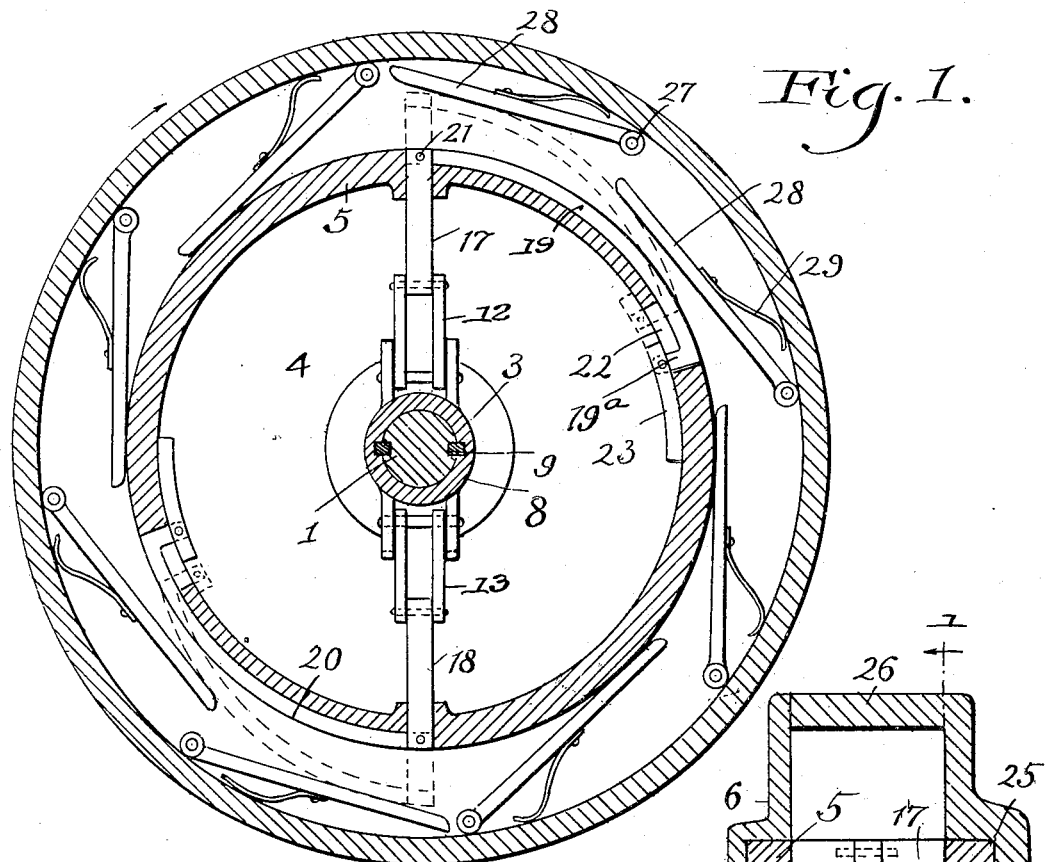
Figure 2:
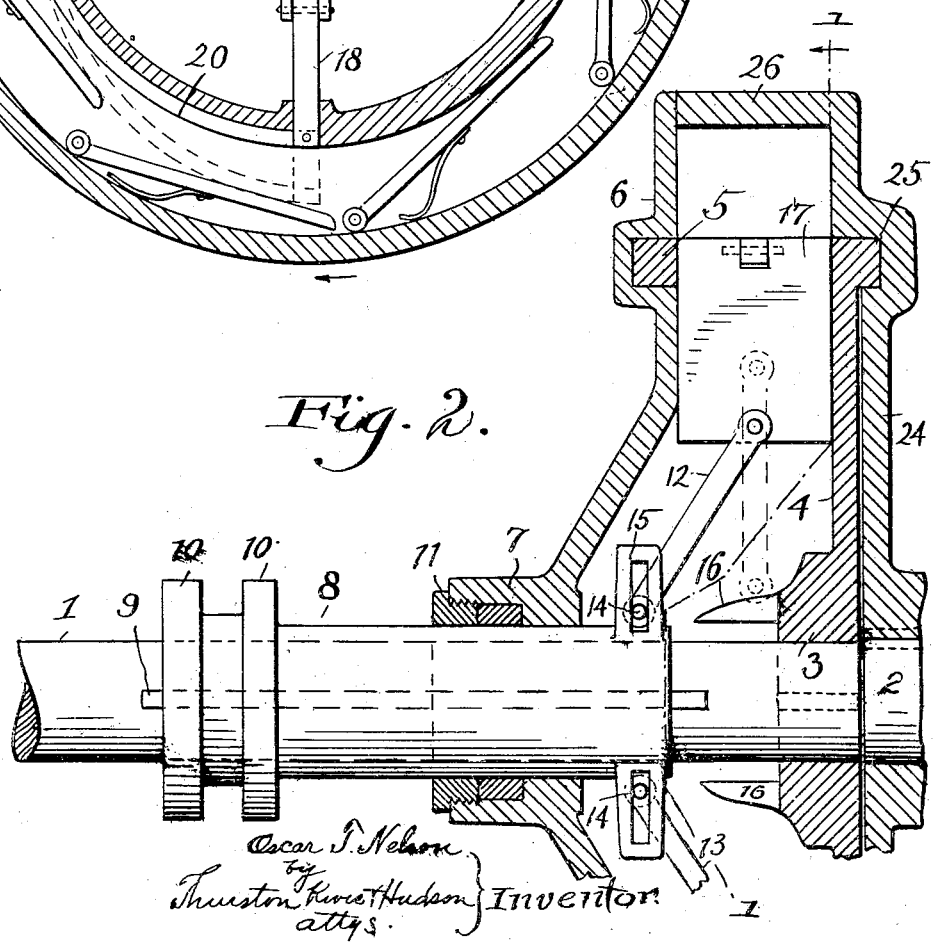

Reference should be had to the accompanying drawings which form a part of this specification. In which the Fig. 1 is a sectional elevation taken on the line 1—1 of Fig. 2, and Fig. 2 is a central sectional elevation taken at right angles to Fig. 1.

Referring to the drawings, 1 may indicate a driving shaft and 2 indicates a driven shaft. Secured to the driving shaft 1 is a hollow drum which comprises a hub portion 3 that is secured on the shaft 1, an end wall 4 and an inwardly laterally extending flange 5. Cooperating with the open end of this drum is a plate 6 which has a groove in which the edge of the flange 5 extends. The plate 6 has a hub portion 7 which extends around the sleeve 8 which sleeve is mounted on the shaft 1, and is adapted to slide upon this shaft. There is a driving connection between the shaft 1 and the sleeve 8 which is effected by a key and keyway construction such as indicated at 9 in Fig. 1. The sleeve 8 has two spaced collars 10 between which collars may be placed a suitable lever mechanism by which the sleeve 8 may be moved on the shaft 1. The hub 7 contains a packing 11 which surrounds the sleeve 8, making an oil-tight packing so that the sleeve 8 may be reciprocated through the hub 7, without danger of leaking of oil, as will be later described.

At the end of the sleeve 8 which extends within the end plate 6 there are links 12 and 13. These links have pins at their ends such as indicated at 14 which are adapted to slide in slots 15 that are formed upon projections of the sleeve 8. The projections on the sleeve 8, having slots 15 formed therein, are so formed that the pointed cam-shaped operating members 16 carried by the hub 3, may pass beneath the inner ends of the links 12 and 13, when the sleeve 8 is reciprocated inwardly, and shifting the links 12 and 13 outwardly during the latter portion of the inward movement of the sleeve 8.

The outer ends of the links 12 and 13 are pivotally secured to gates 17 and 18 which are adapted to slide through suitable closely fitted openings formed in the flange 5. These gate members 17 and 18 are pushed outwardly when the sleeve 8 is pushed to the right as shown in Fig. 2 and movement of the sleeve 8 in the opposite direction moves these gate members inwardly.

Upon the outside of the flange 5 there lies a pair of curved members such as indicated at 19 and 20. The curved member 19 is associated with the gate 17 and the curved member 20 is associated with the gate 18. The members 19 and 20 are substantially alike and a description of one will suffice for both. This member 19 is pivotally secured to an outer end of the gate 17 as indicated at 21. This member occupies a groove in the flange 5 so that when the member 19 is against the flange and the member 17 is at its most inward position, the member 19 lies substantially flush with the outer surface of the flange 5. The opposite end of the member 19 to that which has been described has a short arm $19^a$, which extends through a slot 22 formed in the flange 5. Upon the inside of the flange there is a curved slidable member 23 to which the short arm $19^a$ is pivotally connected. This permits the member 19 to move pivotally as the gate 17 is shoved outwardly and the length of the slot 22 in which the arm $19^a$ operates is just sufficient to allow the required movement of the member 19 when the gate 17 is pushed outwardly.

Secured upon the shaft 2 is a plate member 24 which, adjacent its outer edge, is provided with a groove 25 that receives an extension of the flange 5. At the outer edge of the plate 24 there is a flange 26 which cooperates with the plate 6 forming a substantially tight joint. Pivoted within the flange 26 by means of pivots 27 is a series of leaves such as indicated at 28 which yieldably engage the flange 5. Each of these leaves as before stated, is pivotally mounted upon a pin 27 and cooperating with each leaf is a spring such as is indicated at 29 which normally bears against the inner surface of the flange 26 and urges the leaf 28 into contact with the outer surface of the flange 5. Each of these leaves is of substantially the same width as the distance between the plates 24 and 6 at the portions thereof which lie between the flanges 5 and 26, and this space as well as the space which is comprehended between the plate 4 and the plate 6 is filled with oil. Thus the moving parts of the clutch become self-lubricating and furthermore this body of oil is made use of to in effect form the connecting means between the movable parts of the clutch. If we assume that the gates 17 and 18 are turned to their innermost position and the shaft 1 be turned, it will carry with it the sleeve 8, the plate 6 and the plate 3, and although the interior of the mechanism as above described is filled with oil, there is nothing that will oppose the rotative movement of the parts associated with the shaft 1. There will, however, be no motion transmitted to the shaft 2.

If, now, we assume that the gates 17 and 18 are pushed outwardly as indicated in Fig. 1 of the drawings, and that the shaft 1 is being turned, rotation of the plate 3 and the plate 6 in a clockwise direction as indicated by the arrows on Fig. 1 of the drawings, and the fact that the gates 17 and 18 are pushed outwardly, will cause oil to be moved by the gates, which oil will pocket itself between the leaves 28 and the outer flange 26 and this pocketing of the oil will serve to cause the plate 24 to move with the rotating members carried by the shaft 1. So long as this is maintained the shafts 1 and 2 will effectually clutch to each other.

The purpose of the member 19 which is attached to the outer end of the gate 17, as well as the member 20 which is pivoted to the outer end of the gate 18, is to provide a camming surface which will engage with the ends of the leaves 28, bearing the initial pushing out of the gates 17 and 18, thus preventing any snubbing action between the ends of the gates 17 and 18 and the ends of the leaves 28.

Having described my invention, I claim—

1. The combination with a driving member and a driven member, said members being constructed to form a chamber between them, confining elements carried by one of said members, a second element carried by the other of said members, said second element being adapted to be projected into the said chamber and in cooperation with the first mentioned elements confining a portion of said fluid which serves to connect the said members, and a member for shifting the confining elements, said shifting member being pivoted to the end of said second element and slidably connected to the member carrying said second element.

2. The combination with a driving member and a driven member, one of said members being provided with a flange which forms a lower wall of a chamber, the other of said members being provided with a flange which forms an opposite wall of a chamber, a body of fluid confined within the said chamber, pivoted elements carried by one of said members and said elements being mounted within the said chamber, a gate having a radially disposed front face carried by the other of said members, said gate being adapted to be projected into the said chamber, the said pivoted elements and the said gate cooperating to confine portions of said fluid which serves to connect the said members, and means for shifting said pivoted elements comprising a bar pivoted to the gate and projecting forwardly therefrom.

3. The combination with a driving member and a driven member, said members being formed to provide a chamber and body of fluid confined within said chamber, pivoted elements mounted on one of said members within the said chamber, resilient means acting upon said members and forcing them into engagement with the inner wall of said chamber to prevent flow of fluid past said elements, a slidable fluid impelling element carried by the other of said members and adapted to be projected into the said chamber, the said slidable element and a pivoted element cooperating to confine portions of said fluid thereby to connect the said chambers, and a relatively narrow bar having a part movable with the impelling element and extending in advance of said impelling element for shifting said pivoted elements to permit the impelling element to move past the pivoted elements.

4. The combination with a driving member and a driven member, a sleeve upon one of said members which is splined to said member, an outwardly extending part mounted on said sleeve and a substantially outwardly extending part secured to the shaft upon which the sleeve is mounted, said last mentioned outwardly extending part having a flange which cooperates with the first mentioned outwardly extending part, the said driven member having an outwardly extending part that has a flange which cooperates with the first mentioned outwardly extending part and forms therewith a closed chamber, a liquid within said chamber, pivoted members carried by the said driven member which pivoted members extend transversely of the chamber, a slide member carried by the driving member adapted to be projected into the said chamber, and link mechanism connected between the said slide member and the said sleeve and means engaging with the links for retaining the slide members in an extended position.

5. A clutch mechanism comprising a driving member and a driven member having laterally extending cylindrical flanges, the flange of one member being concentric with the flange of the other member, a closure member rotatable with one of said flanged members and cooperating with said flanged members to form an outer annular closed chamber and an inner chamber, both chambers being adapted to be filled with liquid, vanes pivoted adjacent the outer flange and bearing against the inner flange, a radially movable gate slidably mounted in the inner flange and adapted to be moved into the annular chamber, means within the inner chamber for shifting said gate, and means extending through said closure member for operating said shifting means.

In testimony whereof, I hereunto affix my signature.

OSCAR T. NELSON.